(12) United States Patent
Sato (10) Patent No.: US 9,488,305 B2
(45) Date of Patent: Nov. 8, 2016

(54) JOINT

(71) Applicant: SUGINO MACHINE LIMITED, Uozu-shi, Toyama (JP)

(72) Inventor: Sho Sato, Toyama (JP)

(73) Assignee: SUGINO MACHINE LIMITED, Uozu-shi (JP)

( * ) Notice: Subject to any disclaimer, the term of this patent is extended or adjusted under 35 U.S.C. 154(b) by 249 days.

(21) Appl. No.: 14/335,305

(22) Filed: Jul. 18, 2014

(65) Prior Publication Data

US 2015/0028580 A1 Jan. 29, 2015

(30) Foreign Application Priority Data

Jul. 25, 2013 (JP) ................................. 2013-154549

(51) Int. Cl.
*F16L 39/00* (2006.01)
*F16L 41/02* (2006.01)

(52) U.S. Cl.
CPC .................................... *F16L 41/021* (2013.01)

(58) Field of Classification Search
USPC .......... 285/130.1, 125.1, 273, 123.9, 123.13, 285/123.14, 124.5
See application file for complete search history.

(56) References Cited

U.S. PATENT DOCUMENTS

| | | | | |
|---|---|---|---|---|
| 2,046,579 A * | 7/1936 | Penick | .................... | E21B 33/04 277/637 |
| 2,104,180 A * | 1/1938 | Barker | .................... | E21B 33/04 285/123.13 |
| 3,011,804 A * | 12/1961 | Burns | .................... | E21B 33/047 166/97.5 |
| 3,025,083 A * | 3/1962 | Lebeaux | ............... | E21B 33/047 166/89.2 |
| 3,151,892 A * | 10/1964 | Word, Jr. | ............... | E21B 33/047 285/123.2 |
| 3,166,345 A * | 1/1965 | Pinkard | .................... | F16L 23/20 277/322 |
| 4,109,942 A * | 8/1978 | Morrill | .................... | E21B 33/04 285/123.13 |
| 4,569,540 A * | 2/1986 | Beson | ..................... | E21B 33/04 285/123.13 |
| 9,255,647 B2 * | 2/2016 | Matthews | ............... | F16K 27/00 |
| 2006/0038399 A1* | 2/2006 | Tremoulet | ................ | B24C 9/00 285/124.5 |

FOREIGN PATENT DOCUMENTS

JP A-2008-510937 4/2008
WO WO 2006/023708 A1 3/2006

* cited by examiner

*Primary Examiner* — Aaron Dunwoody
(74) *Attorney, Agent, or Firm* — Oliff PLC (57) ABSTRACT

Setting position, direction and magnitude of compressive force applied to a crossing part. A joint with: crossing part in which first and second channels bored in casings cross on an XY plane; and pressure device holds casings from both sides with crossing part between the direction of the Z-axis perpendicular to the XY plane by a pressure member and applies compressive force to the crossing part, the pressure device with: a bored part h is formed in the casings, into which the pressure device is fitted and supports pressure; adjusting the compressive force, the pressure member is in position including an intersection of a peripheral wall of the first and second channels in the z-axis direction, an abutting part of the pressure member and bottom of the bored part presses intersection of peripheral walls; a noncontact part provided to the center preventing the center of the crossing part from pressing.

6 Claims, 11 Drawing Sheets

JOINT

BACKGROUND

1. Field of the Invention

The present invention relates to a joint, especially relates to a joint having a crossing part where two channels cross.

2. Description of the Related Art

Heretofore, a high pressure joint such as an elbow joint, a T-connection and a cruciform joint is a member which is provided with a crossing part where two channels cross and which supplies high-pressure fluid to a desired location, bending the high-pressure fluid supplied from a high pressure pump, joining it and branching it respectively in the crossing part, and the high pressure joint is widely used in various high-pressure fluid injection systems. As in the crossing part in the high pressure joint, pressure (internal pressure) by high-pressure fluid flowing in the channel repeatedly acts and varies, it is known that a crack caused by the internal pressure has an important effect upon the life of the joint (for example, refer to Japanese Unexamined Patent Application Publication No. 2008-510937 (claim 1, claim 2, Paragraphs 0018 to 0020, FIGS. 7, 8A, 8B, 8C, and 13)).

A high pressure joint disclosed in Japanese Unexamined Patent Application Publication No. 2008-510937 makes compressive energizing force concentrate over and under a location (a crossing part) where a channel 128 in a direction of the X-axis and a channel 130 in a direction of the Y-axis respectively formed on a common plane (an XY plane) in a main body 122 cross and negates separating power (internal stress) in a direction of the Z-axis which acts perpendicularly to the common plane and which tries to separate in the direction of the Z-axis by the compressive energizing force so as to prevent a crack caused on the common plane (the XY plane).

Concretely, the high pressure joint disclosed in Japanese Unexamined Patent Application Publication No. 2008-510937 clamps first and second compressive members 132 in which a compressive protrusion 134 that applies compressive force with the main body 122 between is formed by a clamp 138 and applies compressive energizing force to the crossing part.

However, first, as a position of the compressive protrusion 134 and a position of the clamp that applies compressive force are different in the high pressure joint disclosed in Japanese Unexamined Patent Application Publication No. 2008-510937, the high pressure joint has a problem that a position, a direction and the magnitude of compressive force applied to the crossing part where the channels cross cannot necessarily be properly set.

Besides, secondly, as various internal pressure acts on the crossing part where the channels cross by high-pressure fluid, the high pressure joint has a problem that unexpected various deformation occurs in the crossing part by compressive force (uniaxial lateral compression) when the compressive force in the direction of the z-axis is applied to the center of the crossing part as in the high pressure joint disclosed in Japanese Unexamined Patent Application Publication No. 2008-510937, internal stress newly caused by the deformation is superimposed on internal pressure of the high-pressure fluid and new damage may be caused. It is also an indeterminate factor that a direction and a position of compressive force applied to the crossing part are not necessarily properly managed.

Unexpected various internal stress (for example, internal stress in a direction along the XY plane) newly caused by compressive force applied to the center of the crossing part will be described, referring to FIGS. 1, 2A, 2B, 2C, 3A, 3B and 3C below.

Figure 1:
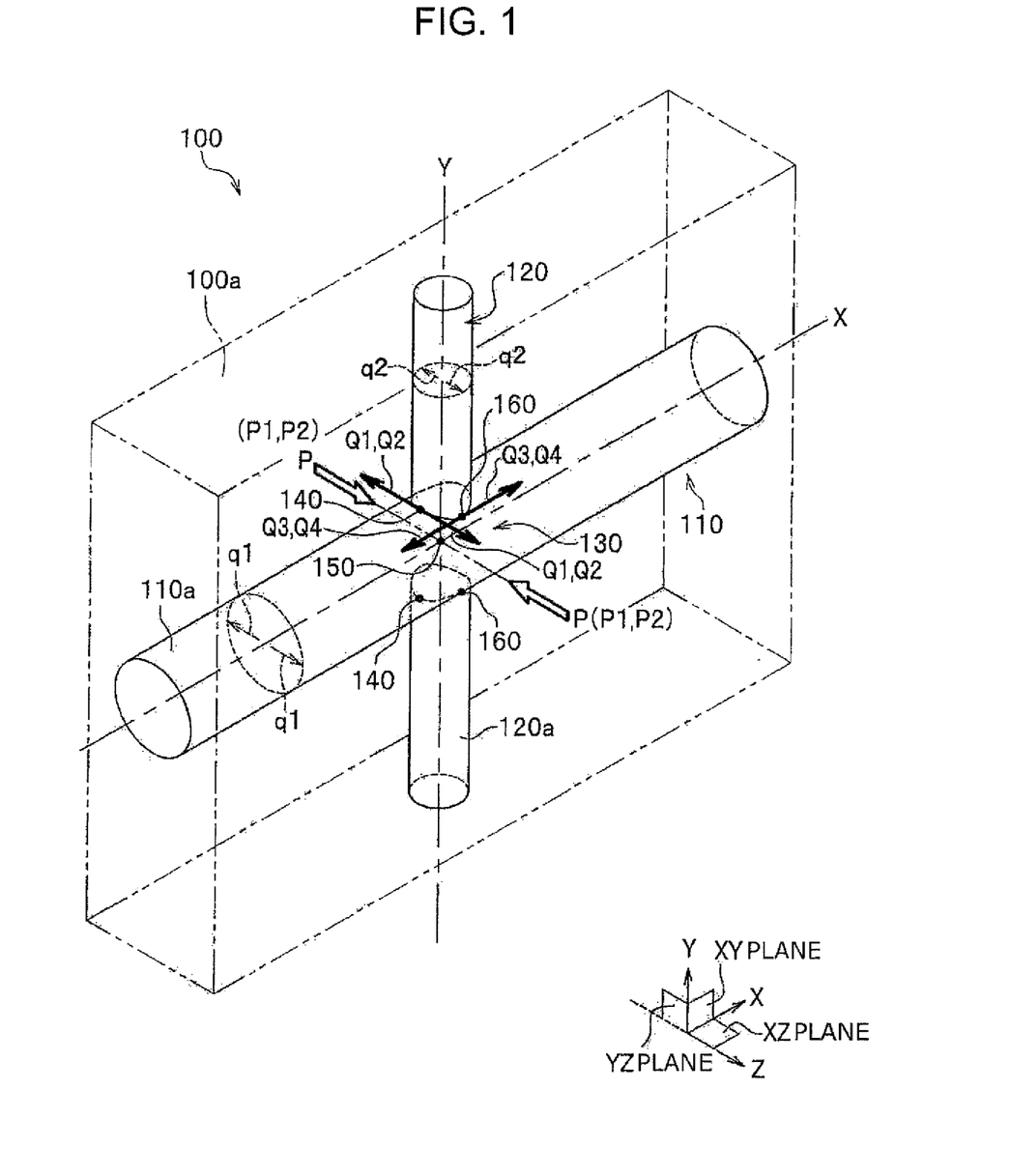
FIG. 1 is a perspective view showing internal pressure that acts on a crossing part and applied compressive force.
Figure 2A:
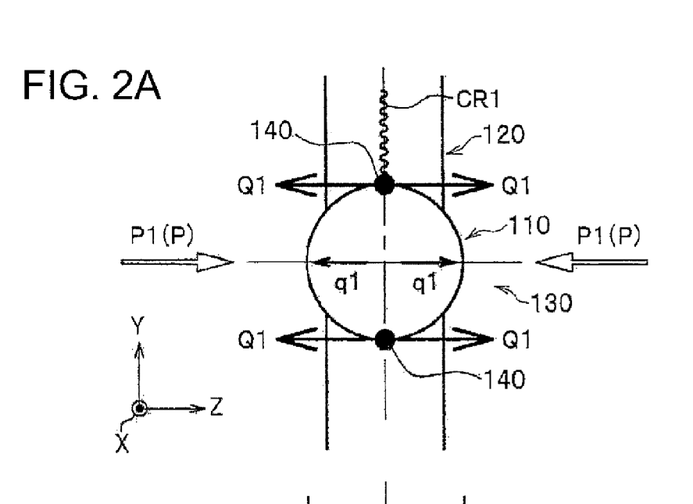
FIG. 2A is a front sectional view showing the crossing part viewed from a direction of the X-axis.
Figure 2B:
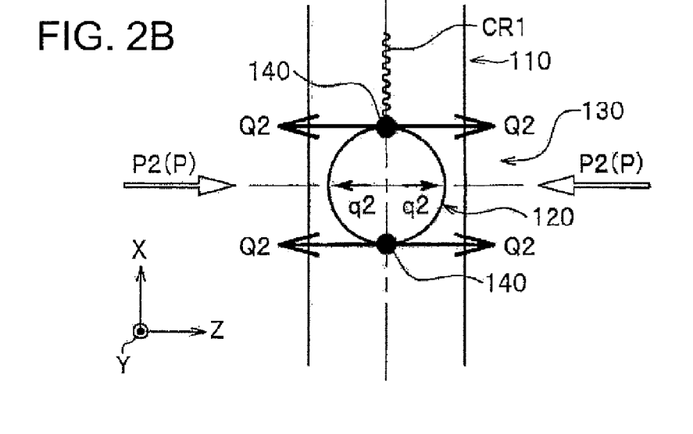
FIG. 2B is a side sectional view viewed from a direction of the Y-axis.
Figure 2C:
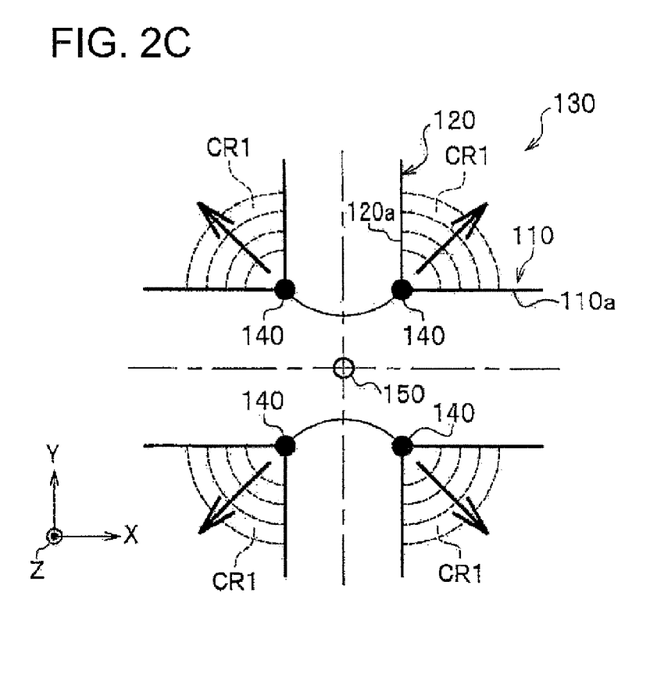
FIG. 2C is a plan view showing a state in which a crack is caused on an XY plane and viewed from the direction of the Z-axis.
Figure 3A:
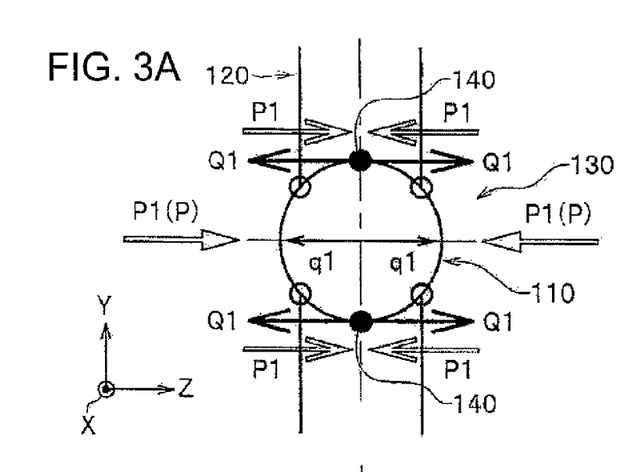
FIG. 3A is a front sectional view showing the crossing part viewed from a direction of the X-axis.
Figure 3B:
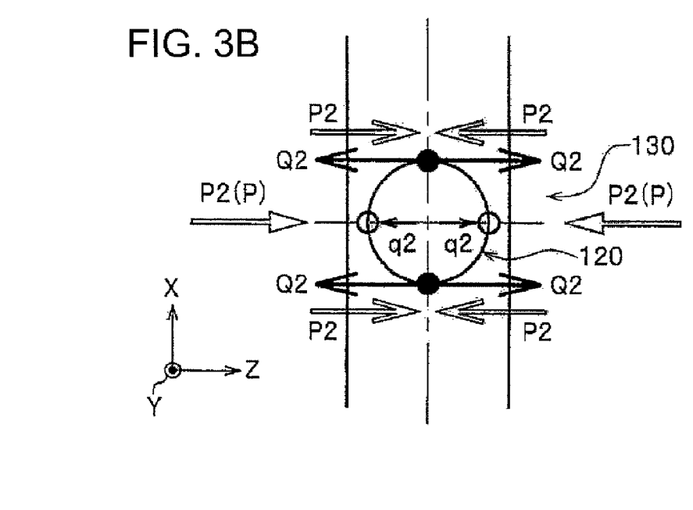
FIG. 3B is a side sectional view viewed from a direction of the Y-axis.
Figure 3C:
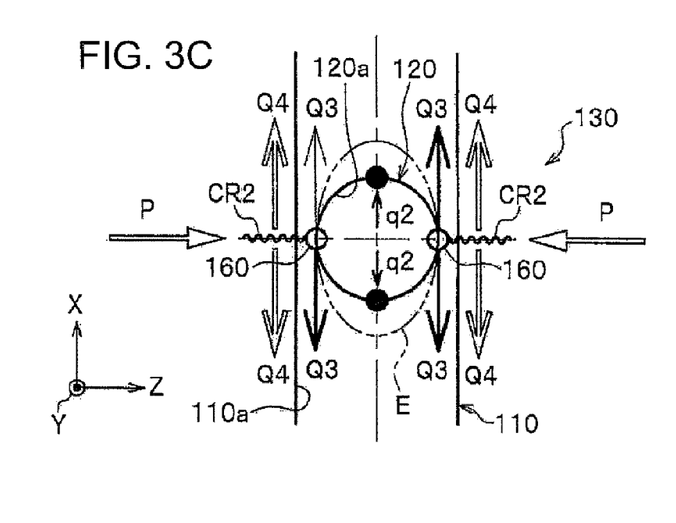
FIG. 3C is a front view showing a state in which internal stress in a direction along an XY plane is caused by compressive force

Referred FIG. 1 is a perspective view showing internal pressure that acts on the crossing part where the channel in the direction of the X-axis and the channel in the direction of the Y-axis cross. FIGS. 2A, 2B, 2C are drawings for explaining internal stress by the internal pressure that acts on the crossing part, wherein FIG. 2A is a front view viewed from the direction of the X-axis, FIG. 2B is a side view viewed from the direction of the Y-axis, and FIG. 2C is a plan view viewed from the direction of the Z-axis and showing a state in which a crack occurs on the XY plane. FIGS. 3A, 3B, 3C show relation between the internal stress by the internal pressure and compressive force, wherein FIG. 3A is a front view viewed from the direction of the X-axis, FIG. 3B is a side view viewed from the direction of the Y-axis, and FIG. 3C is a front view showing a state in which internal stress in the direction along the XY plane is caused by compressive force P.

In the following description, as shown in FIG. 1, for the convenience of the description, a virtual plane on which a first channel 110 and a second channel 120 pass is called an XY plane, a direction of the first channel 110 is called a direction of the X-axis, a direction of the second channel 120 is called a direction of the Y-axis, and a direction perpendicular to the XY plane is called a direction of the Z-axis. Besides, a plane including the Y-axis and the Z-axis is called a YZ plane and a plane including the X-axis and the Z-axis is called an XZ plane.

<Internal Stress by Internal Pressure>

As shown in FIG. 1, in a cruciform joint 100, the first channel 110 in the direction of the X-axis and the second channel 120 in the direction of the Y-axis respectively formed in a casing 100a join in a crossing part 130 on the XY plane. An intersection 140 in the crossing part 130 is an interface on the XY plane of a peripheral wall 110a of the first channel 110 and a peripheral wall 120a of the second channel 120 (see FIG. 2C). That is, the intersection 140 is an intersection of the peripheral wall 110a of the first channel 110 and the peripheral wall 120a of the second channel 120 when the crossing part 130 is viewed from the direction of the Z-axis as shown in FIG. 2C.

At this intersection 140, as shown in FIG. 2A, internal stress Q1 by internal pressure q1 of pressure fluid flowing in the first channel 110 acts in the direction of the Z-axis. Besides, as shown in FIG. 2B, internal stress Q2 by internal pressure q2 of pressure fluid flowing in the second channel 120 acts in the direction of the Z-axis. Therefore, stress concentration occurs at the intersection 140 by the internal stress Q1 and the internal stress Q2, a crack CR1 is apt to be caused, and as shown in FIG. 2C, the crack CR1 extends on the XY plane.

To prevent the crack CR1 caused on the XY plane, as shown in FIG. 1, the internal stress Q1 and the internal stress Q2 are negated by compressive force P (P1, P2)(see FIGS. 2A, 2B) by pressing the casing 100a so that the compressive force P (P1, P2) is applied to the center 150 (see FIG. 2C) of the crossing part 130 from both sides in the direction of the Z-axis as shown in FIG. 1, and the occurrence of the crack CR1 (see FIG. 2C) can be inhibited.

Concretely, as shown in FIG. 3A, the internal stress Q1 by the internal pressure q1 of the pressure fluid flowing the first channel 110 is negated by the compressive force P (P1) and as shown in FIG. 3B, the internal stress Q2 by the internal pressure q2 of the pressure fluid flowing in the second channel 120 is negated by the compressive force P (P2).

For the convenience of description, the compressive force P is conceptually assorted into the compressive force P1 and the compressive force P2 to correlate with the internal stress Q1 and the internal stress Q2, however, the compressive force P may be also considered resultant force of the compressive force P1 and the compressive force P2.

<New Internal Stress by Applied Compressive Force>

However, it is supposed that new various internal stress by unexpected deformation occurs in the crossing part 130 by applying the compressive force P to the center 150 of the crossing part 130 from the direction of the Z-axis.

For example, as shown in FIG. 3C, in view of an intersection 160 (see FIG. 1) on the YZ plane (a plane including the Y-axis and the Z-axis and perpendicular to the X-axis) where the peripheral wall 110a of the first channel 110 and the peripheral wall 120a of the second channel 120 cross, internal stress Q4 in the direction of the X-axis perpendicular to the YZ plane occurs because deformation that a diameter of the second channel 120 is extended in the direction of the X-axis and the diameter is reduced in the direction of the Z-axis occurs (see a reference sign E) by applying the compressive force P.

Further, at the intersection 160 (see FIG. 1) on the YZ plane, as internal stress Q3 by the internal pressure q2 of the pressure fluid flowing in the second channel 120 acts in the direction of the X-axis, resultant force of the internal stress Q4 by the compressive force P and the internal stress Q3 in the direction of the X-axis by the internal pressure q2 of the pressure fluid causes a crack CR2 in a direction along the YZ plane.

Accordingly, a new harmful effect by the internal stress Q4 in the direction of the X-axis perpendicular to the YZ plane which is caused by the compressive force P in the direction of the Z-axis applied to the center 150 (see FIGS. 1, 2C) of the crossing part 130 where the plural first channel 110 and second channel 120 cross is required to be inhibited.

The present invention is made in view of such a background and provides a joint in which a position, a direction and the magnitude of compressive force applied to a crossing part where two channels cross are properly set, the occurrence of new internal stress by compressive force that pressurizes the crossing part is inhibited and the durability can be enhanced.

SUMMARY

In order to address the problem, a first feature of the present invention provides a joint having: the first channel and the second channel respectively bored in a casing; the crossing part where the first channel and the second channel cross on an XY plane; and pressure means that applies compressive force to the crossing part with the casing between by a pressure member from both sides with the crossing part between in a direction of the Z-axis perpendicular to the XY plane. The pressure means is provided with: a bored part which is formed in the casing, into which the pressure means is fitted and which supports the pressure means; and adjusting means that adjusts the compressive force. The pressure member is arranged in a position including an intersection of a peripheral wall of the first channel and a peripheral wall of the second channel in the direction of the Z-axis. An abutting part of the pressure member and the bottom of the bored part presses a position matched with the intersection of the peripheral walls, and a noncontact part is provided to the center not to press a position matched with the center of the crossing part.

In the present invention, first, the pressure member is arranged in a position suitable for the crossing part by being provided with the bored part into which the pressure means is fitted and which supports it and can be stably supported. Besides, compressive force of suitable magnitude can be applied to the crossing part via the pressure member by being provided with the adjusting means that adjusts the compressive force.

As described above, the present invention effectively negates internal stress in the direction of the Z-axis by suitably applying compressive force of the suitable magnitude to a proper position of the crossing part via the pressure member, inhibits the occurrence of a crack, and can enhance the durability of the joint.

In the present invention, secondly, the abutting part of the pressure member and the bottom of the bored part presses the position matched with the intersection of the peripheral wall and compressive force can be applied to the intersection of the peripheral wall of the first channel and the peripheral wall of the second channel precisely from the direction of the Z-axis without applying compressive force to an intersection of a center line (the center of the crossing part) of the first channel and the second channel in the crossing part by being provided with the noncontact part in the center so that the position matched with the center of the crossing part is not pressed.

Therefore, internal stress in the direction of the Z-axis caused in the crossing part is effectively negated, inhibiting the deformation of the crossing part and the occurrence of a crack can be prevented.

As described above, the present invention effectively prevents new internal stress caused by deformation from being superimposed on internal stress by internal pressure of high-pressure fluid flowing in the first channel and the second channel and from causing new fatigue and damage by inhibiting the deformation of the crossing part and others by applied compressive force and avoiding the occurrence of new internal stress caused by the deformation, and can enhance the durability of the joint.

In accordance with a second feature, in addition to the joint described in the first feature, the abutting part of the pressure member and the bored part is point contact.

According to such configuration, as the abutting part is point contact, a point of application of compressive force can be precisely set, a location where stress concentrates is concentratively pressed, and the occurrence of a crack can be effectively inhibited.

In accordance with a third feature, in addition to the joint described in the first feature, an abutting part of the pressure member and the bottom of the bored part is annular plane contact.

According to such configuration, as the abutting part is plane contact, compressive force can be uniformly applied to the crossing part in a planar area in the abutting part. Therefore, a location where stress concentrates is securely pressed by widely pressing the location where stress concentrates and its circumference and the occurrence of a crack can be effectively inhibited.

In accordance with a fourth feature, in addition to the joint described in the first feature, the adjusting means is provided with a tapped hole formed in the casing coaxially with the bored part and a threaded portion formed in the pressure member, the pressure member is screwed to the tapped hole by the threaded portion and the compressive force is adjusted by screw torque of the pressure member.

According to such configuration, compressive force can be precisely applied to the crossing part from the direction of the Z-axis owing to the threaded portion formed on the pressure member by screwing the pressure member to the tapped hole formed coaxially with the bored part into which the pressure member is inserted. Besides, as the magnitude of compressive force can be optimally set by adjusting the compressive force by screw torque of the pressure member, internal stress in the direction of the Z-axis is more effectively negated, the occurrence of a crack is inhibited, and the durability of the joint can be enhanced.

In accordance with a fifth feature, in addition to the joint described in the fourth feature, the pressure member is provided with a screw on which the threaded portion is formed and a pressure piece which abuts on an end of the screw and in which a abutting part is formed and a diameter of the abutting part of the pressure piece is smaller than that of the screw.

According to such configuration, as the diameter of the screw is increased and the diameter of the pressure piece can be reduced by being provided with the pressure piece the diameter of which is smaller than the diameter of the screw, damage is prevented, securely applying screw torque to the screw and compressive force can be properly applied to the crossing part.

In accordance with a sixth feature, in addition to the joint described in the second feature, an abutting part having the casing between the abutting parts of the pressure member is spherical and the abutting part is made to abut on a position matched with the intersection of the peripheral wall of the first channel and the peripheral wall of the second channel in the direction of the Z-axis.

According to such configuration, as the abutting part of the pressure member and the preceding part is point contact because the abutting part is spherical and a point of application of compressive force can be precisely set, compressive force can be precisely applied to the position matched with the intersection of the peripheral wall of the first channel and the peripheral wall of the second channel in the direction of the Z-axis.

Besides, internal stress in the direction of the Z-axis which is concentratively caused at the intersection of the peripheral walls is effectively negated by applying compressive force to the intersection of the peripheral walls, the occurrence of a crack is more securely inhibited, and the durability of the joint can be enhanced.

In the joint according to the present invention, a position, a direction and the magnitude of compressive force applied to the crossing part where the two channels cross can be properly set.

BRIEF DESCRIPTION OF THE DRAWINGS

Embodiments of the present invention will be described in detail based on the following drawings, in which:

FIGS. 2A, 2B, and 2C are schematic diagrams for explaining internal stress by the internal pressure that acts on the crossing part, wherein

FIGS. 3A, 3B, and 3C are schematic diagrams showing relation between internal stress by internal pressure and compressive force, wherein FIGS. 4A and 4B are sectional views showing the configuration of a joint equivalent to a first embodiment of the present invention, wherein

FIGS. 5A and 5B are sectional views showing a modification of the joint equivalent to the first embodiment of the present invention, wherein

FIGS. 7A, 7B, and 7C are schematic diagrams for explaining internal stress by internal pressure which acts on the crossing part of the joint equivalent to the first embodiment of the present invention, wherein

FIGS. 9A and 9B are sectional views showing the configuration of the joint equivalent to the second embodiment of the present invention, wherein FIG. 93 is a plan view viewed from a direction of the Z-axis and viewed along a line A-A in FIG. 9A;

FIGS. 10A, 10B, and 10C are schematic diagrams showing the operation of the joint equivalent to the second embodiment of the present invention, wherein FIGS. 11A and 11B are sectional views showing a modification of the joint equivalent to the second embodiment of the present invention, wherein

DETAILED DESCRIPTION

Referring to FIGS. 4A, 4B, 5A, 5B, 6, 7A, 7B, and 7C suitably, a cruciform high pressure joint 1A which is a joint equivalent to a first embodiment of the present invention will be described in detail below.

Figure 4A:
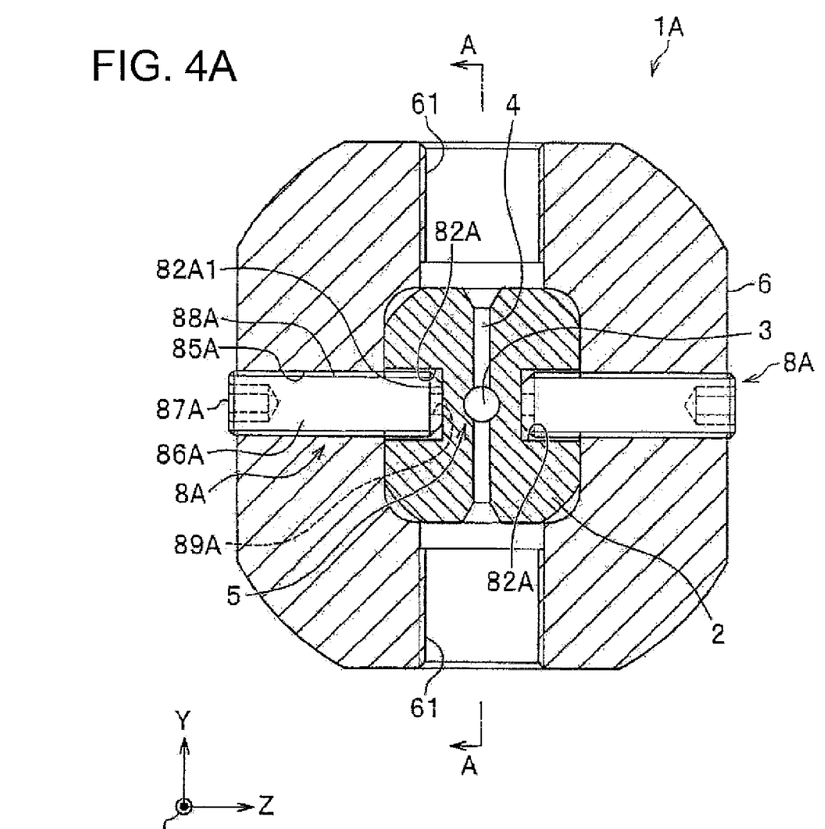
FIG. 4A is a front view viewed from a direction of the X-axis.
Figure 4B:
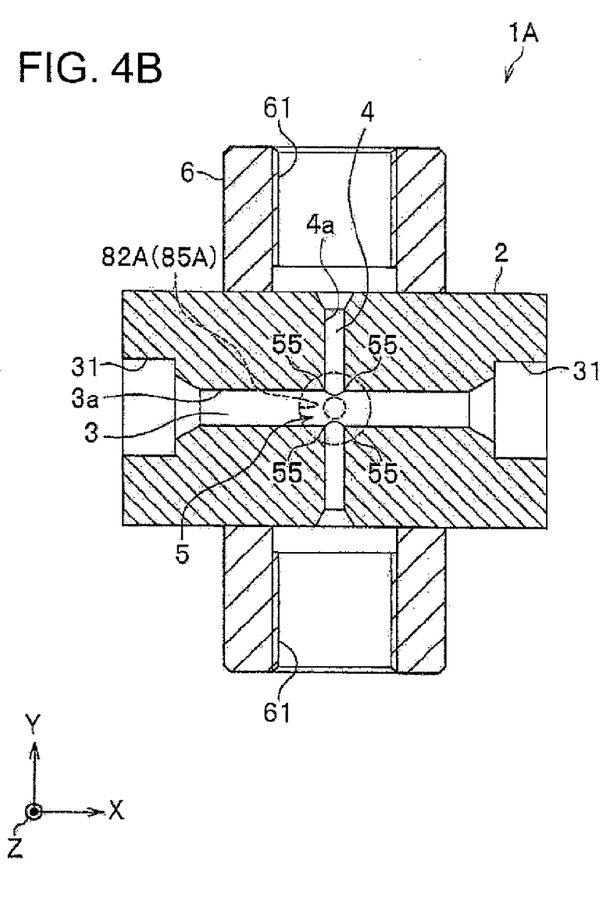
FIG. 4B is a plan view viewed from a direction of the Z-axis and viewed along a line A-A in FIG. 4A.

A high pressure joint 1 is provided with a first casing 2, a first channel 3 and a second channel 4 respectively bored in the first casing 2, a crossing part 5 where the first channel 3 and the second channel 4 cross on an XY plane, a second casing 6 fitted to the outside of the first casing 2 with the second casing covering the first casing 2, and pressure means 8A that annularly applies compressive force P (see FIG. 6) to the first casing 2 with the crossing part 5 between the pressure means 8A as shown in FIGS. 4A, 4B.

Figure 6:
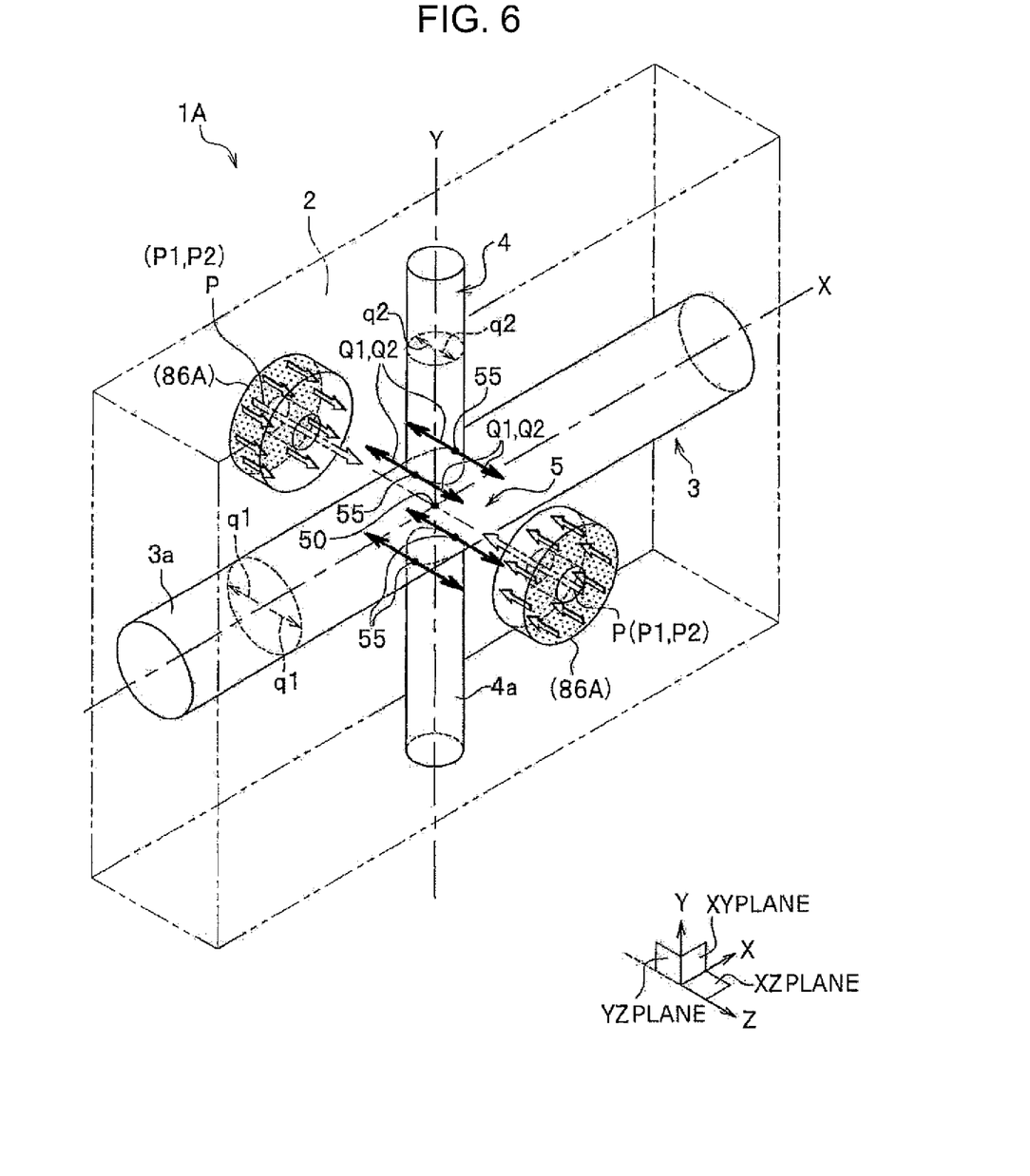
FIG. 6 is a perspective view showing internal pressure which acts on a crossing part of the joint equivalent to the first embodiment of the present invention and applied compressive force.

In the following description, as shown in FIG. 6, a virtual plane which the first channel 3 and the second channel 4 pass is called the XY plane, a direction of the first channel 3 shall be a direction of the X-axis, a direction of the second channel 4 shall be a direction of the Y-axis, and a direction perpendicular to the XY plane shall be a direction of the Z-axis. Besides, a plane including the Y-axis and the Z-axis is called a YZ plane and a plane including the X-axis and the Z-axis is called an XZ plane.

The first casing 2 is configured by a square bar-shaped member the section of which is rectangular as shown in FIG. 4A and its corners are chamfered so that the first casing 2 is easily inserted into the second casing 6. As shown in FIG. 4B, in the first casing 2, the first channel 3 is bored in the direction of the X-axis and the second channel 4 is bored in the direction of the Y-axis. The first channel 3 and the second channel 4 are perpendicular in the crossing part 5, and the first channel 3 and the second channel 4 can make high-pressure fluid (not shown) flowing in the first channel 3 and high-pressure fluid (not shown) flowing in the second channel 4 join or separate.

The second casing 6 is a toroidal member in the center of which a rectangular through hole where the first casing 2 is inserted is formed as shown in FIG. 4A and is provided with a coupling part 61 that is a tapped hole in which a high pressure pipe (not shown) that supplies high-pressure fluid to the second channel 4 is coupled. In the second casing 6, a pressure part that configures the pressure means 8A that applies the annular compressive force P (see FIG. 6) to the first casing 2 with the crossing part 5 between the pressure means 8A is installed.

In this embodiment, in consideration of the diversity and the workability of combination, a casing is divided into the first casing 2 and the second casing 6, however, the present invention is not limited to this, and the first casing 2 and the second casing 6 may be also integrated.

The first channel 3 is an annular passage formed along a longitudinal direction (the direction of the X-axis) of the first casing 2 on the XY plane as shown in FIG. 4B and at both ends of the first channel 3, a coupling part 31 to which a high pressure pipe (not shown) where high-pressure fluid flows is coupled is formed. The second channel 4 is an annular passage formed along a shorter direction (the direction of the Y-axis) of the first casing 2 on the XY plane.

As for the first channel 3 and the second channel 4, various shapes can be suitably adopted depending upon applications and others of the high pressure joint 1A and in the embodiment, a diameter of the second channel 4 is set to be smaller than that of the first channel 3, however, the present invention is not limited to this, and the first channel 3 and the second channel 4 may also have the same diameter.

The crossing part 5 is a part in which the first channel 3 and the second channel 4 on the XY plane join or separate. As internal pressure varies by high-pressure fluid supplied from the first channel 3 and the second channel 4 in the crossing part 5 and a repeated load is applied, the crossing part is in a heavy working condition.

In the crossing part 5, an interface on the XY plane of a peripheral wall 3a of the first channel 3 and a peripheral wall 4a of the second channel 4 is called an intersection 55 as shown in FIGS. 4B and 6.

Concretely, as shown in FIG. 6, the first channel 3 in the direction of the X-axis formed in the casing 2 and the second channel 4 in the direction of the Y-axis similarly formed in the casing 2 join in the crossing part 5 on the XY plane. The intersection 55 in the crossing part 5 is the interface on the XY plane of the peripheral wall 3a of the first channel 3 and the peripheral wall 4a of the second channel 4 (see FIG. 7C). That is, the intersection 55 is an intersection of the peripheral wall 3a of the first channel 3 and the peripheral wall 4a of the second channel 4 when the crossing part 5 is viewed from the direction of the Z-axis as shown in FIG. 7C.

The high pressure joint 1A in this embodiment of the present invention is configured so that the first casing 2 is held from both sides with the crossing part 5 between the pressure means 8A in the direction of the Z-axis as shown in FIGS. 4A and 6 and the annular compressive force P including uniform distributed loads is applied to the crossing part 5 by the pressure means 8A.

The pressure means 8A is provided with a bored part 82A formed in the first casing 2, a tapped hole 85A formed coaxially with the bored part 82A in the second casing 6, and a screw 86A which is screwed to the tapped hole 85A and which is a pressure member that presses the first casing 2 as shown in FIG. 4A.

As the pressure means 8A is arranged with a pair opposite so that the first casing 2 is held from both sides with the crossing part 5 between the pair of pressure means 8A in the direction of the Z-axis and the pair of pressure means 8A have the similar configuration, the left pressure means 8A in FIG. 4A will be described below and the detailed description of the right pressure means 8A will be omitted.

The bored part 82A is bored from a surface of the first casing 2 to the vicinity of the crossing part 5 in the direction of the Z-axis, its bottom 82A1 is flat, and an and of the screw 86A reaches the bottom 82A1. The screw 86A is inserted and supported so that the end of the screw 86A is fitted to the bored part 82A.

The tapped hole 85A is formed coaxially with the bored part 82A in the direction of the Z-axis from a surface of the second casing 6.

As for the screw 86A, an external thread 88A which is a threaded portion screwed to the tapped hole 85A is formed on its periphery, its end that abuts on the first casing 2 is flat, a recess 89A which is a noncontact part and the section of which is circular is formed in the center, and a hexagon socket 87A for rotating the screw 86A is formed at its rear end.

Owing to such configuration, as the end of the screw 86A which functions as the pressure member is flat, the end of the screw 86A and the bottom of the bored part 82A formed in the first casing 2 abut each other.

Therefore, the annular compressive force P (see FIG. 6) including the uniform distributed loads is applied roughly to the first casing 2 from both sides with the crossing part 5 between in the direction of the Z-axis, detailedly to circumferences of the intersections including the four intersections 55 of the peripheral wall of the first channel 3 and the peripheral wall of the second channel 4.

Besides, as the recess 89A which is a noncontact part is formed at the end of the screw 86A as the pressure means 8A, an intersection 50 (see FIGS. 6, 7C and it is merely called the center 50 of the crossing part 5) of center lines of the first channel 3 and the second channel 4 in the crossing part 5 is not pressed.

That is, the pressure means 8A can precisely apply the uniform distributed loads to the circumferences of the four intersections 55 by applying the annular compressive force P (see FIG. 6) including compressive force to the four intersections 55 of the peripheral wall 3a of the first channel 3 and the peripheral wall 4a of the second channel 4 without applying compressive force to the center 50 of the crossing part 5.

In addition, as the pressure means 8A can adjust the compressive force P (see FIG. 6) by screw torque by screwing the screw 86A to the tapped hole 85A, the compressive force P can be simply and suitably set (means for adjusting compressive force).

<Modification of Pressure Member>

Figure 5A:
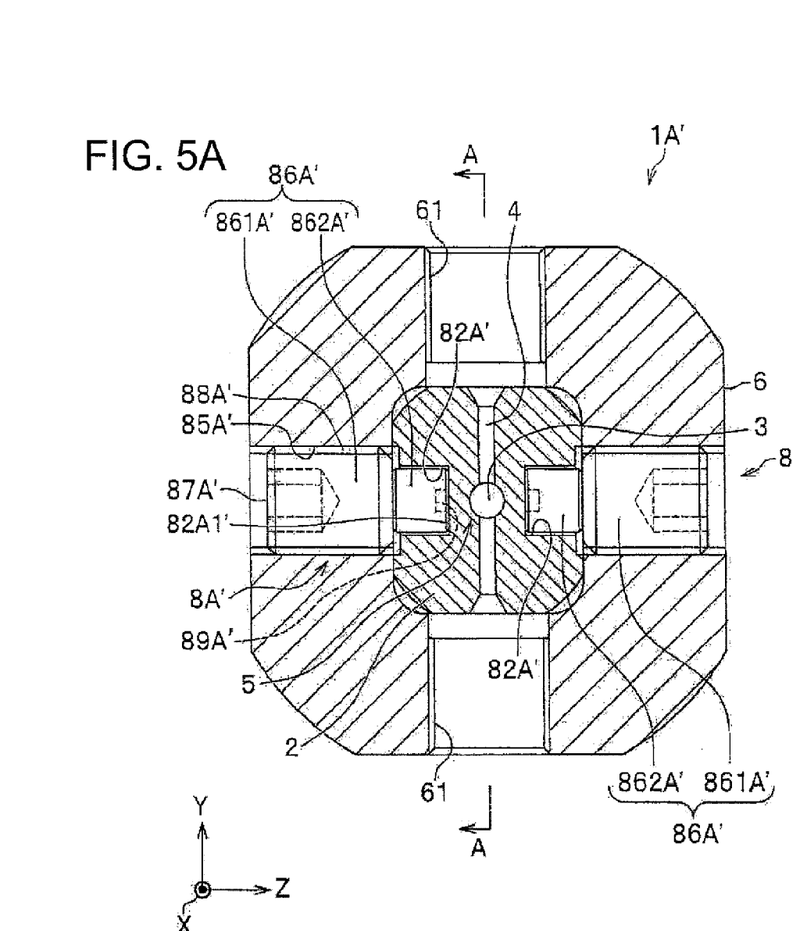
FIG. 5A is a front view viewed from a direction of the X-axis.
Figure 5B:
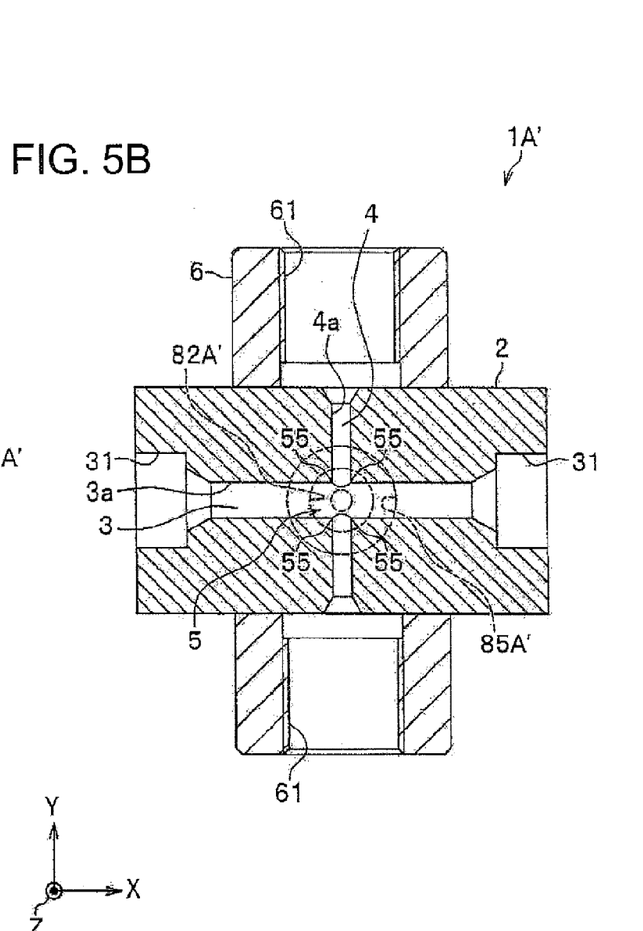
FIG. 5B is a plan view viewed from a direction of the Z-axis and viewed along a line A-A in FIG. 5A.

In the above-mentioned pressure means 8A, the pressure member is configured by the screw 86A, however, the present invention is not limited to this, and as follows, the pressure member may be also changed to a pressure member. FIGS. 5A and 5B are sectional views showing a modification of the pressure member, wherein FIG. 5A is a front view viewed from a direction of the X-axis, and FIG. 5B is a plan view viewed from a direction of the Z-axis and viewed along a line A-A in FIG. 5A. In FIGS. 5A, 5B, the same reference numeral is allocated to the similar configuration to that in FIGS. 4A, 4B and the detailed description of the similar configuration in the modification is omitted.

Pressure means 8A' in the modification of the first embodiment is provided with a bored part 82A' formed in a first casing 2, a tapped hole 85A' formed in a second casing 6 to have a larger diameter than the diameter of the bored part 82A' and a pressure member 86A' that presses the first casing 2 as shown in FIG. 5A.

The pressure member 86A' has an external thread 88A' and the external thread 88A' is provided with a screw 861A' screwed to a tapped hole 85A' and a cylindrical pressure piece 862A' which abuts on an end of the screw 861A' and which is fitted into the bored part 82A'.

An end that abuts on the first casing 2 of the pressure piece 862A' is flat, and in the center of the end, a recess 89A' which is a noncontact part and the section of which is circular is formed. A diameter of the pressure piece 862A' is formed to be smaller than a diameter of the screw 861A'. As for the screw 861A', a hexagon socket 87A' for rotating the screw 861A' is formed at its rear end and is equivalent to means for adjusting compressive force that adjusts the compressive force P (see FIG. 6).

In the modification, the screw 861A' and the pressure piece 862A' are separately configured, however, they may be also integrated.

Owing to such configuration, as in the pressure means 8A' in the modification of the first embodiment, the diameter of the screw 861A' is made longer and the pressure piece 862A' can be reduced by reducing the diameter of the pressure piece 862A' more than the diameter of the screw 861A', damage can be prevented, securely applying screw torque to the screw 861A' and compressive force can be suitably applied to intersections 55 (see FIG. 5B).

In the above-mentioned modification, compressive force adjusting means in the pressure means adjusts compressive force by screw torque when the screw 861A' is screwed to the tapped hole 85A', however, the present invention is not limited to this, a through hole is formed in place of the tapped hole 85A', a pin is inserted into the through hole in a state in which the pressure piece 862A' is fitted into the bored part 82A', a fixing member is fixed to the second casing 6 by a fixture, the pin is pressed by the fixing member, and compressive force may be also applied to the pressure piece 862A'. Screw torque that fastens the fixing member is also adjusted by such configuration and the compressive force can be adjusted.

The action and the effect of the high pressure joints 1A, 1A' configured as described above in the first embodiment of the present invention will be described mainly referring to FIGS. 6, 7A, 7B, and 7C below.

<Occurrence of Internal Stress by Internal Pressure>

Figure 7A:
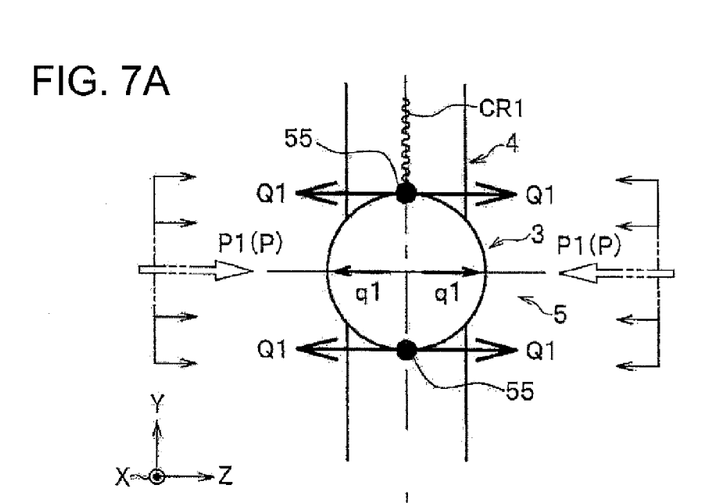
FIG. 7A is a front sectional view showing the crossing part viewed from a direction of the X-axis.
Figure 7B:
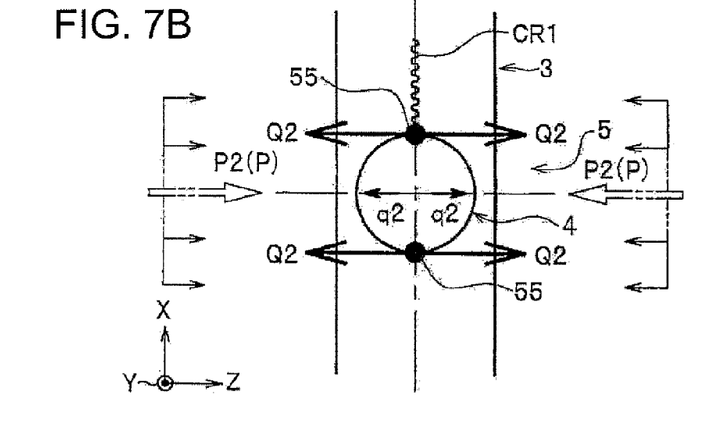
FIG. 7B is a side sectional view viewed from a direction of the Y-axis.
Figure 7C:
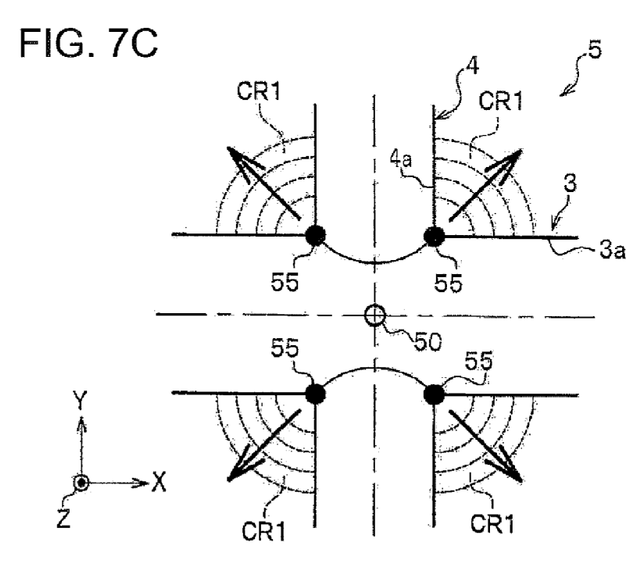
FIG. 7C is a plan view showing a state in which a crack is caused on an XY plane and viewed from a direction of the Z-axis.

As shown in FIG. 6, in the high pressure joint 1A, at the intersection 55 of the peripheral wall 3a of the first channel 3 and the peripheral wall 4a of the second channel 4 when the crossing part 5 is viewed from the direction of the Z-axis, internal stress Q1 by the internal pressure q1 of pressure fluid flowing in the first channel 3 acts in the direction of the Z-axis (see FIGS. 4A and 4B) as shown in FIG. 7A. Besides, as shown in FIG. 7B, internal stress Q2 by the internal pressure q2 of pressure fluid flowing in the second channel 4 acts in the direction of the Z-axis (see FIG. 6).

Therefore, stress concentration is caused at the intersection 55 by the internal stress Q1 and the internal stress Q2, a crack CR1 is apt to be made, and when a crack CR1 is made at the intersection 55, the crack CR1 extends on an XY plane as shown in FIG. 7C.

<Negation of Internal Stress>

To prevent a crack CR1 from being made on the XY plane, the high pressure joint 1A negates the internal stress Q1 by the compressive force P (P1)(see FIG. 7A), negates the internal stress Q2 by the compressive force P (P2)(see FIG. 7B) by not applying the annular compressive force P (P1, P2) including the uniform distributed loads to the center 50 (see FIGS. 6, 7C) of the crossing part 5 with the center between both sides in the direction of the Z-axis as shown in FIG. 6 but applying the compressive force P (P1, P2) to the circumferences of the four intersections 55 of the peripheral wall 3a of the first channel 3 and the peripheral wall 4a of the second channel 4 with the circumferences between both sides in the direction of the Z-axis as shown in FIG. 6, and the high pressure joint can inhibit the occurrence of the crack CR1 (see FIG. 7C).

In the meantime, the occurrence of unexpected various internal stress (see the internal stress Q4 in FIG. 3C) newly caused by compressive force applied to the center of the crossing part 5 can be avoided by not pressing the center 50 (see FIGS. 6, 7C) of the crossing part 5 by the annular compressive force P (P1, P2).

As described above, the high pressure joint 1A effectively negates the internal stress in the direction of the Z-axis caused in the crossing part 5, inhibiting the deformation of the crossing part 5 and can prevent the occurrence of a crack.

The compressive force P (P1, P2) has been conceptually described in a state in which the compressive force is assorted into the compressive force P1 and the compressive force P2 to correlate them with the internal stress Q1 and the internal stress Q2 for the convenience of explanation, however, the compressive force P may be also considered resultant force of the compressive force P1 and the compressive force P2.

Next, a cruciform high pressure joint 1B which is a joint equivalent to a second embodiment of the present invention will be described in detail, suitably referring to FIGS. 8, 9A, 9B, 10A, 10B, and 10C.

Figure 8:
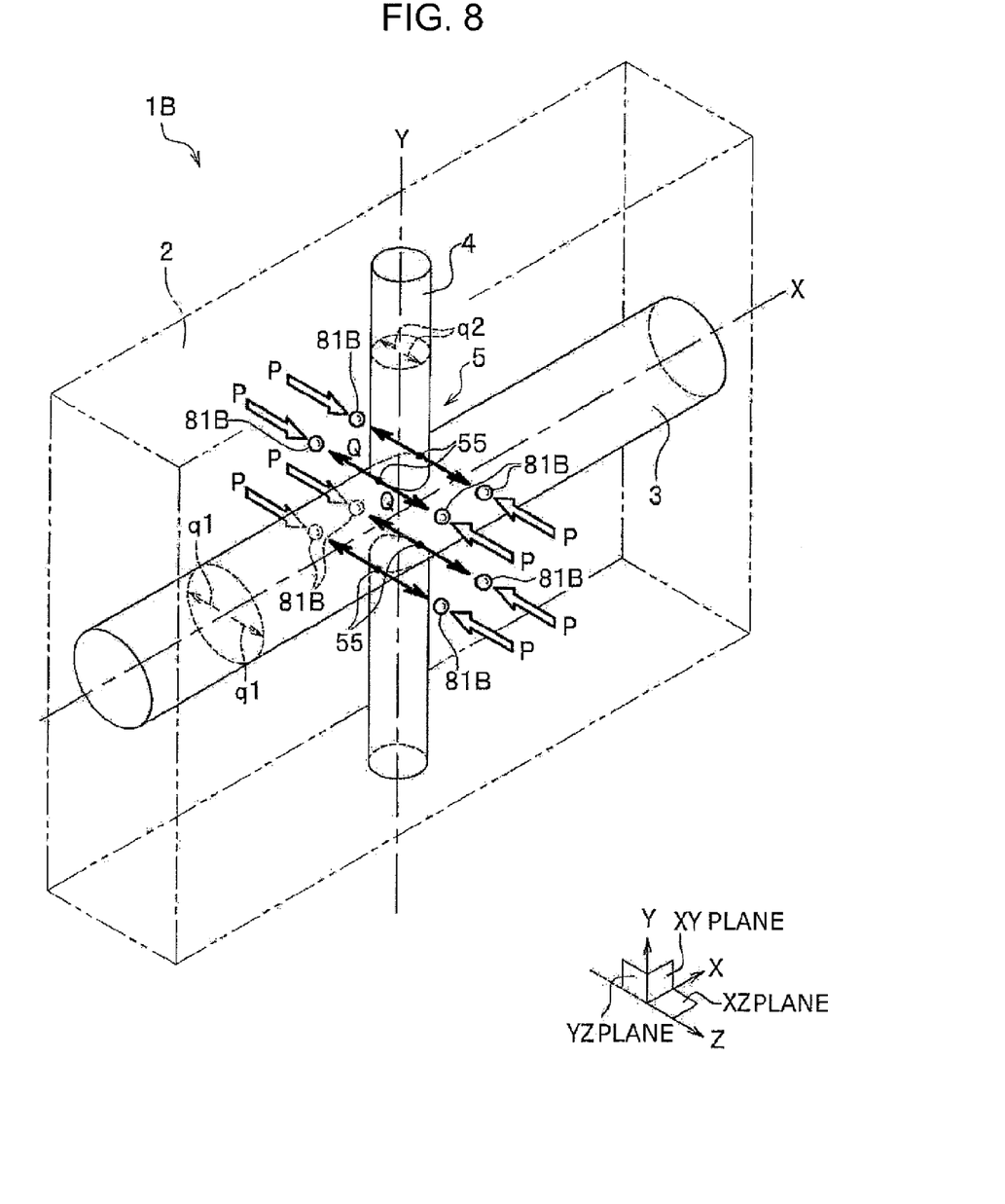
FIG. 8 is a perspective view showing relation between internal pressure which acts on a crossing part of a joint equivalent to a second embodiment of the present invention and applied compressive force.
Figure 9A:
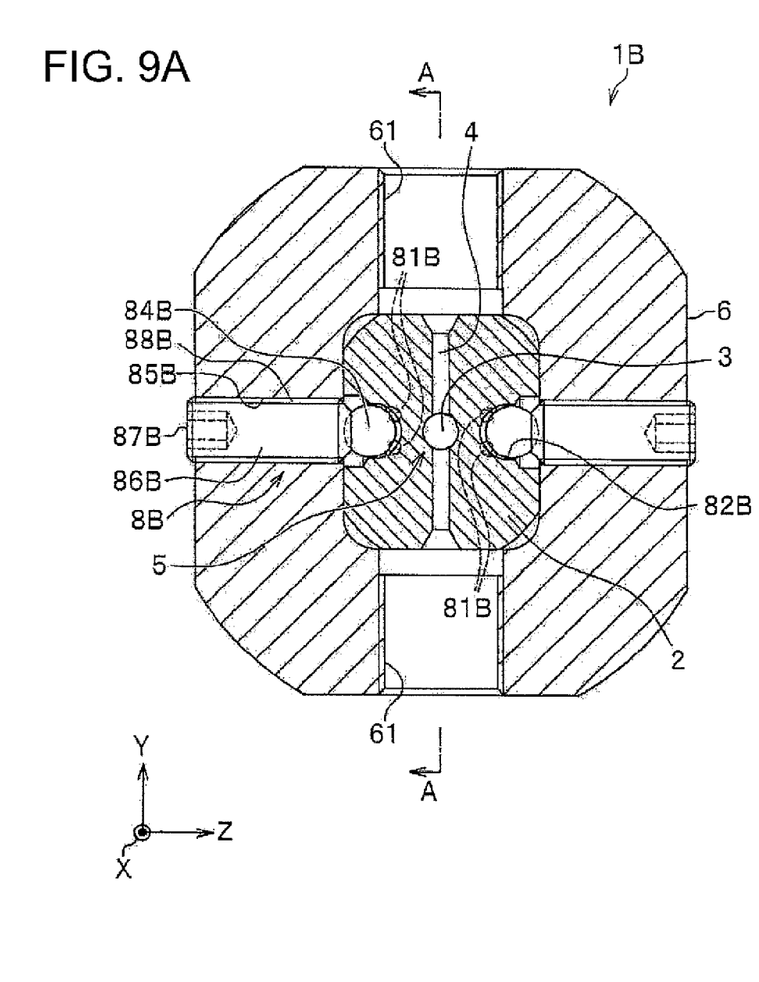
FIG. 9A is a front view viewed from a direction of the X-axis.
Figure 9B:
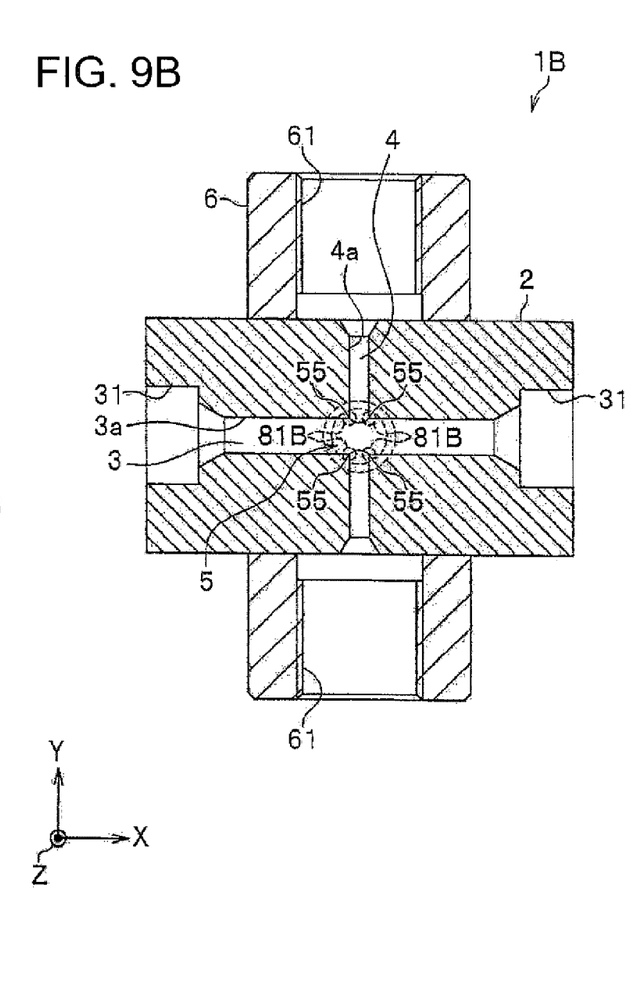

The high pressure joint 1B equivalent to the embodiment of the present invention is configured so that a first casing 2 is held between four spheres 81B (see FIG. 10A) that configure a pressure member from both sides with a crossing part 5 between in a direction of the Z-axis as shown in FIGS. 8, 9A and compressive force P is applied to four intersections 55 (see FIG. 9B) in the crossing part 5 by pressure means 8B.

Therefore, in the following description, the same reference numeral is allocated to the similar component to that of the high pressure joint 1A in the above-mentioned first embodiment and repeated description is omitted.

The pressure means 8B is provided with: a bored part 82B formed in the first casing 2; a holding groove 83B (see FIG. 10A) which is formed at the bottom of the bored part 82B and which holds the four spheres 81B in respective predetermined positions; an intermediate sphere 84B installed in the bored part 82B so as to abut on each four sphere 81B; a tapped hole 85B formed in a second casing 6 coaxially with the bored part 82B; and a screw 86B which is screwed to this tapped hole 85B and which is adjusting means for adjusting compressive force that presses the four spheres 81B on the first casing 2 as shown in FIG. 9A.

In the high pressure joint 1B in the second embodiment, a pressure member in the pressure means BB is configured by the screw 86B, the intermediate sphere 84B and the four spheres 81B.

Figures 10A, 10B:
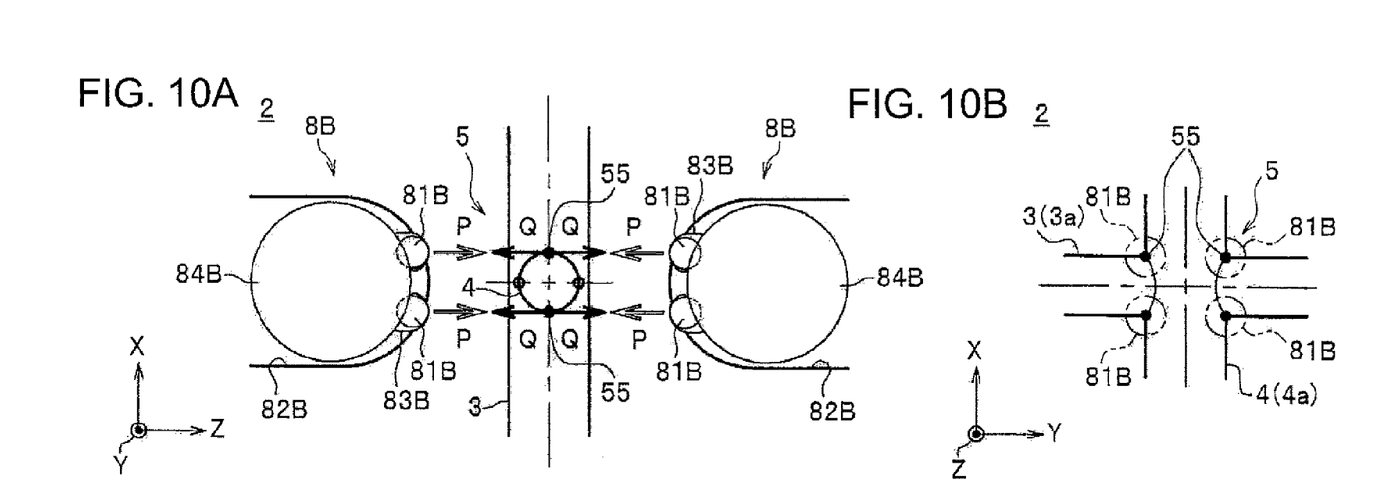
FIG. 10A is a front sectional view viewed from a direction of the X-axis.
FIG. 10B is a plan view viewed from a direction of the Z-axis.

The four spheres 81B is arranged in predetermined positions (hereinafter merely called predetermined positions) matched with intersections 55 of a peripheral wall 3a of a first channel 3 and a peripheral wall 4a of a second channel 4 when they are viewed from the direction of the Z-axis as shown in FIG. 10B.

Owing to such configuration, the compressive force P (see FIG. 10A) is applied with the intersections 55 between both sides in the direction of the Z-axis via the first casing 2. Besides, as a point of application of the compressive force P can be precisely set by making a part that abuts on the first casing 2 spherical, the compressive force P can be precisely applied to the positions matched with the intersections 55 from the direction of the Z-axis.

In this embodiment, the first casing 2 is pressed by the four spheres 81B so as to apply compressive force, however, the present invention is not limited to this, and only an end that abuts on the first casing 2 can be also made spherically convex. Besides, the present invention is not limited to the spherical shape and a plane shape acquired by reducing a contact area can be also adopted.

The bored part 82B is bored up to the vicinity of the crossing part 5 in the direction of the Z-axis from a surface of the first casing 2 and the holding groove 83B that holds the four spheres 81B in the respective predetermined positions is formed at the bottom.

The holding groove 83B is a hollow groove fitted to a shape of the sphere 81B as shown in FIG. 10A and can hold the sphere 81B without making the sphere move from the predetermined position.

The intermediate sphere 84B is interposed between the screw 86B and the four spheres 81B as shown in FIG. 9A. The intermediate sphere 84B is a member for uniformly transmitting the pressure of the screw 86B to the four spheres 81B. The intermediate sphere 84B is installed in the bored part 82B so that the intermediate sphere 84B has a larger diameter than each four sphere 81B and abuts on the four spheres 81B arranged in the predetermined positions.

The tapped hole 85B is formed coaxially with the bored part 82B in the direction of the Z-axis from a surface of the second casing 6.

On a periphery of the screw 86B, an external thread 88B which is a threaded portion screwed to the tapped hole 85B is formed, a conical keep hole fitted to the intermediate sphere 84B is formed at its end that abuts on the intermediate sphere 84B, and a hexagon socket 87B for rotating the screw 86B is formed at a rear end.

Owing to such configuration, as the pressure means 8B presses the four spheres 81B by screw torque by screwing the screw 863 to the tapped hole 85B and can adjust the compressive force P (see FIG. 8), the compressive force P can be simply and suitably set (means for adjusting compressive force).

The pressure means 8B simultaneously presses the four spheres 81B via each intermediate sphere 84B and applies the compressive force P, however, the present invention is not limited to this, and the compressive force P applied to the four spheres 81B may be also independently adjusted (independent adjustment type pressure means).

Figure 10C:
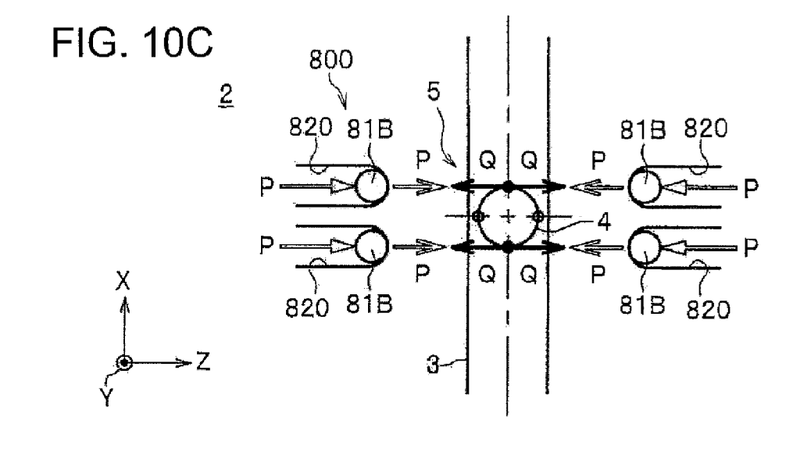
FIG. 10C is a front sectional view showing another embodiment of pressure means and viewed from the direction of the X-axis.

An independent adjustment type pressure means 800 is provided with: a bored part 820 which is formed in the first casing 2 and which houses the sphere 81B at the bottom; a tapped hole (not shown because the tapped hole is similar to the tapped hole 85B) formed in the first casing 2 coaxially with the bored part 820; and a screw (not shown because the screw is similar to the screw 86B) which is screwed to the tapped hole and which presses the sphere 81B on the first casing 2 as shown in FIG. 10C.

That is, in the pressure means 800, the four bored parts 820 that hold the four spheres 81B in respective predetermined positions without providing an intermediate sphere 84B are independently provided and the screws (not shown) that press the four spheres 81B are also separately provided corresponding to each sphere 81B.

Owing to such configuration, as the pressure means 800 can separately adjust compressive force P by each of the four spheres 813, the compressive force P can be uniformly adjusted in a well-balanced state.

The action and the effect of the high pressure joint 1B equivalent to the above-mentioned second embodiment will be described mainly referring to FIGS. 8, 10A, 10B, 10C below.

The high pressure joint 1B in this embodiment can precisely apply the compressive force P (see FIG. 8) to a position of the intersection 55 via the first casing 2 by the four spheres 81B by arranging the four spheres 81B in the positions matched with the intersections 55 of the peripheral wall 3a of the first channel 3 and the peripheral wall 4a of the second channel 4 when the four spheres 81B are viewed from the direction of the Z-axis.

That is, the high pressure joint 1B in the second embodiment effectively negates internal stress Q in the direction of the Z-axis caused in the crossing part 5, inhibiting the deformation of the crossing part 5 by not uniformly applying the compressive force P (see FIG. 6) including distributed loads around the center 50 (see FIGS. 6, 7C) of the crossing part 5 but precisely applying the compressive force P (see FIG. 8) to the intersections 55 of the peripheral wall 3a of the first channel 3 and the peripheral wall 4a of the second channel 4 from the direction of the Z-axis, and can prevent the occurrence of a crack (see FIGS. 10A, 10C).

The embodiments of the present invention have been described, however, the present invention is not limited to the embodiments, and the present invention can be suitably modified.

For example, in the above-mentioned embodiments, the cruciform high pressure joint 1 has been described, however, the present invention is not limited to this, and can be similarly applied to various-shaped joints such as an elbow joint, a T-connection and a cruciform joint.

Figure 11A:
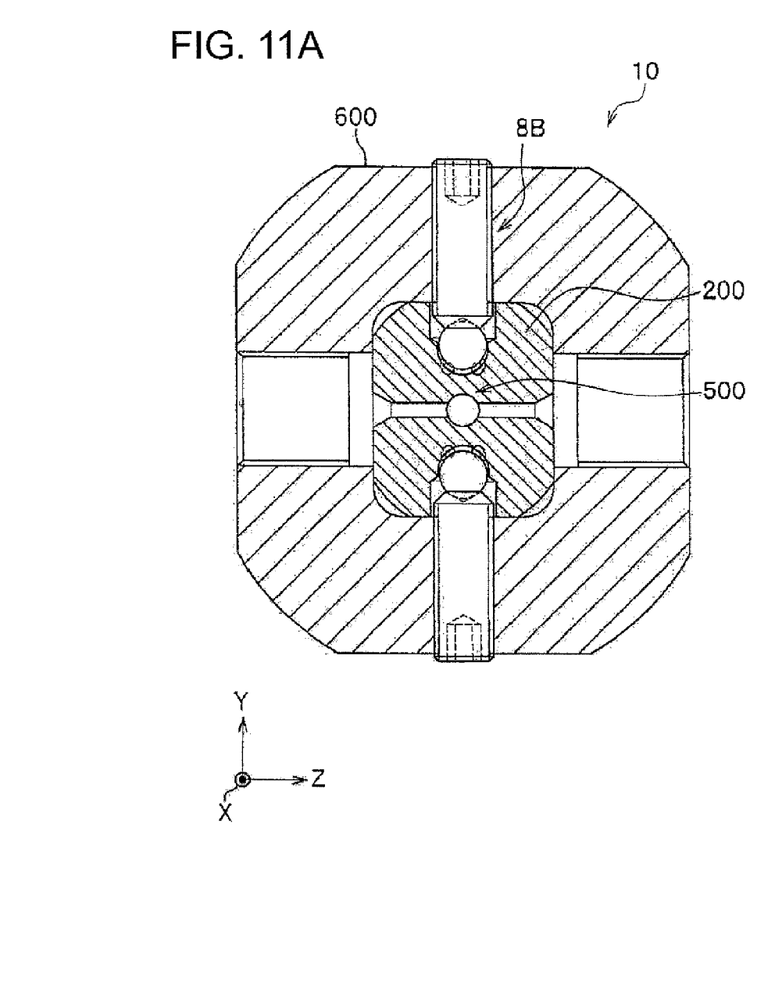
FIG. 11A is a front view viewed from a direction of the X-axis.
Figure 11B:
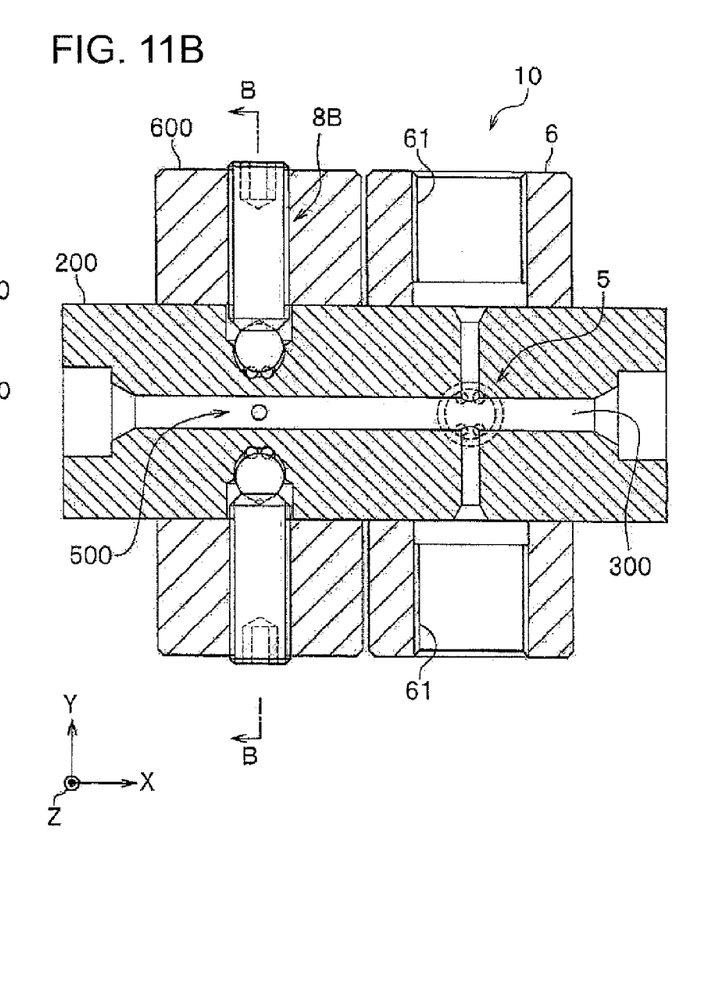
FIG. 11B is a plan view viewed from a direction of the Z-axis and viewed along a line B-B in FIG. 11A.

Besides, in the above-mentioned embodiments, the crossing part 5 is formed by fitting the second casing 6 to the first casing 2, however, the present invention is not limited to this, and as shown in FIGS. 11A, 11B, a high pressure joint 10 acquired by extending a first casing 200, sharing a first channel 300, fitting a third casing 600 different in a direction to the first casing 200 and further, adding a crossing part 500 may be also configured.

What is claimed is:

1. A joint comprising;
    a first channel and a second channel respectively bored in a casing;
    a crossing part in which the first channel and the second channel cross on an XY plane; and
    a pressure device that holds the casing between by a pressure member from both sides with the crossing part between in a direction of the Z-axis perpendicular to the XY plane and applies compressive force to the crossing part,
    wherein the pressure device is provided with:
        a bored part which is formed in the casing, into which the pressure device is fitted and which supports the pressure device; and
        an adjusting device that adjusts the compressive force,
    the pressure member is arranged in a position including an intersection of a peripheral wall of the first channel and a peripheral wall of the second channel in a view from the direction of the Z-axis, and
    an abutting part of the pressure member and the bottom of the bored part presses a position matched with the intersection of the peripheral walls, the abutting part being provided with a noncontact part in the center for preventing a position matched with the center of the crossing part from pressing.

2. The joint according to claim 1, wherein:
    the abutting part of the pressure member and the bored part is point contact.

3. The joint according to claim 1,
    wherein the abutting part of the pressure member and the bottom of the bored part is annular plane contact.

4. The joint according to claim 1,
    wherein the adjusting device is provided with:
        a tapped hole formed in the casing coaxially with the bored part; and
        a threaded portion formed on the pressure member, and
    the pressure member is screwed to the tapped hole via the threaded portion and the compressive force is adjusted by screw torque of the pressure member.

5. The joint according to claim 4,
    wherein the pressure member is provided with:
        a screw on which the threaded portion is formed; and
        a pressure piece which abuts on an end of the screw and in which an abutting part is formed, and
    a diameter of the abutting part of the pressure piece is smaller than a diameter of the screw.

6. The joint according to claim 2,
    wherein the abutting part that holds the casing between of the pressure member is spherical, and
    the abutting part is made to abut on the position matched with the intersection of the peripheral wall of the first channel and the peripheral wall of the second channel in the direction of the Z-axis.

* * * * *